Oct. 22, 1929.  T. LINDNER  1,732,975

VEHICLE EXTRACTION DEVICE

Filed June 16, 1928

Theodore Lindner
INVENTOR

BY Victor J. Evans
ATTORNEY

Patented Oct. 22, 1929

1,732,975

UNITED STATES PATENT OFFICE

THEODORE LINDNER, OF CHICAGO, ILLINOIS

VEHICLE EXTRACTION DEVICE

Application filed June 16, 1928. Serial No. 285,983.

This invention relates to certain novel improvements in vehicle extraction devices, and has for its principal object the provision of an improved construction which will be highly efficient in use and economical in manufacture.

Another object of the invention is to provide a device of the above named character which will be arranged so that it may be disposed in association with the wheel of a vehicle which has become mired or otherwise imbedded and to arrange the device in such a manner that it may be expeditiously installed in position so that it will provide a solid surface over which the vehicle wheel may move in order to facilitate the extraction thereof.

A further object of the invention is to arrange a device of the above named character in such a manner that it may be expeditiously transported and so that it will occupy a minimum amount of space during transportation.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
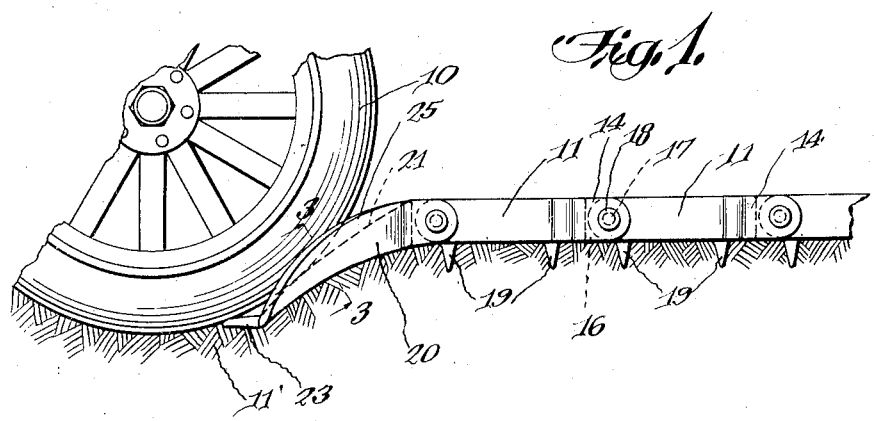
Fig. 1 is a fragmental side view of a vehicle wheel depicting a preferred form of construction for my invention in association therewith so as to facilitate the extraction of the wheel.
Figure 2:
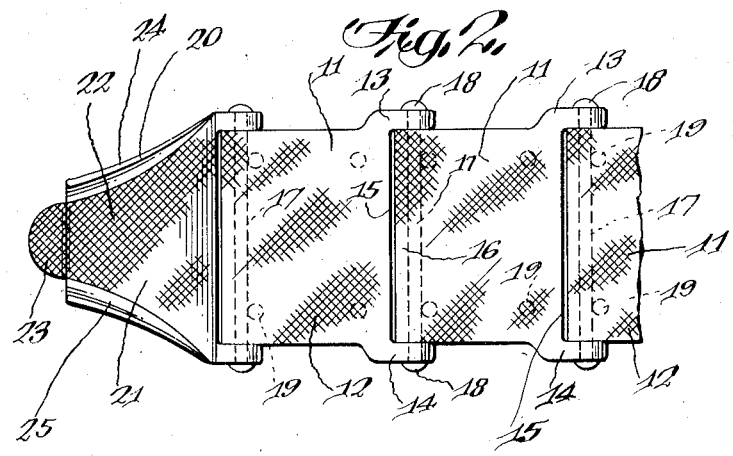
Fig. 2 is a fragmental plan view of the extraction device as illustrated in Fig. 1.
Figure 3:
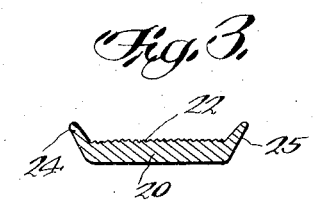
Fig. 3 is a sectional view taken substantially on the line 3—3 on Fig. 1.

In the drawing wherein I have illustrated the preferred form of construction for my invention 10 indicates a vehicle wheel which in the present instance is shown as being mired or depressed. It is understood that the surface in which the wheel 10 is mired which is indicated by 11' may be mud, sand, or other material into which such a wheel might readily sink. My improved device is intended to provide a hard surface over which the wheel 10 may pass in order that the vehicle wheel may be extracted from this mired position and the device is preferably arranged so that the wheel may be caused to move out of this position by the vehicle's own power.

In order to accomplish the foregoing I provide a device which consists of a plurality of relatively flat sections 11 which have the upper surfaces thereof roughened or knurled as indicated at 12. In the present instance I depict each of the sections 11 as embodying outwardly disposed ears 13 and 14 so as to provide a bifurcated portion 15 therebetween but it is to be understood that the ears 13 and 14 might be dispensed with and one end of each of the sections 11 bifurcated so as to provide the inset portion 15. The end portions 16 of each of the sections 11 which are arranged opposite the inset portions 15 are inserted into the portions 15 of juxtaposed sections 11. Suitable openings are provided in the ears 13 and 14 in the end portion 16 through which connecting means such as the rod 17 may be extended. The rod 17 includes headed ends 18 which prevent endwise displacement of the rod members. It will be seen from the foregoing that the sections 11 are hingedly joined together and it is to be understood that any desired number of these sections might be provided. When it is desired to transport the device the sections 11 are folded upon each other in any desired manner and it will thus be apparent that a compact package will be provided which will facilitate the transportation of the device.

On the under side of each of the sections 11 in spaced apart relation I arrange protruding portions 19 which are preferably pointed so as to provide so-called spikes. When the device is disposed in operative position the spikes 19 enter the surface 11' as clearly illustrated in Fig. 1 and it will thus be apparent that the spikes serve to hold the device against displacement.

A device constructed in accordance with the foregoing will be sufficient to permit the extraction of a mired wheel but I have found it desirable to construct the foremost section in a manner such that it will facilitate positioning of the device so as to enable more facile extraction of the wheel. In order to accomplish this I construct the foremost section which is indicated by 20 so that it will embody a downwardly directed upper surface 21 which is preferably knurled as at 22. At the lower end of the section 20 I provide a forwardly extending ear 23 which is preferably disposed parallel to the sections 11 when the device is disposed in operative position as clearly illustrated in Fig. 1. I construct side members on the portion 20 which are curved outwardly so as to provide flared guiding portions which are indicated by 24 and 25. It is apparent that the flared guiding portions terminate along the line of juncture between the tab 23 and the surface 21.

In use, the tab 23 is inserted under the wheel and the bottom surface of the section 20 is then raised along the edge of the rut in which the wheel is mired. Section 20 is connected to the foremost section 11 in a manner substantially similar to that in which the sections 11 are connected together. It is therefore apparent that the sections 11 will extend from the section 20 in aligned relation and after the section 20 has been arranged in a manner hereinbefore set forth, the sections 11 are disposed in said aligned relation and the spikes 19 are embedded in the surface 11'. Power is then supplied so as to cause the wheel 11 to move toward the section 20 and the sections 11 aligned therewith and it is therefore apparent that inasmuch as the upper surface of the sections 20 and 11 are knurled that a hard surface is provided which is easily gripped and which therefore facilitates extraction of the wheel. It is to be understood that if in the event two wheels were mired two such devices as that hereinbefore described might be employed and further it is to be understood that any number of these devices might be associated with the various wheels of the vehicle and obviously these devices will greatly facilitate the extraction of the mired wheels.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claims.

Having thus described my invention what I claim is new and desire to protect by Letters Patent is:

1. An extraction device including a plurality of relatively flat sections, means for pivotally connecting said sections together, and a first section embodying an inclined upper surface adapted to be disposed adjacent the wheel to be extracted, said foremost section having a tab portion at the forward end thereof disposed parallel to and offset from alignment with said relatively flat sections.

2. An extraction device including a plurality of relatively flat sections having the upper surfaces thereof knurled, said sections including bifurcated end portions, the portions opposite said bifurcated end portions being disposed in the bifurcated end portion in juxtaposed sections, means for pivotally connecting said sections together, said relatively flat sections having spike members protruding from the under side thereof, and a front section embodying a downwardly inclined upper surface terminating in a tab portion arranged parallel to but disposed out of alignment with said relatively flat sections.

In testimony whereof I affix my signature.

THEODORE LINDNER.